US006812693B2

United States Patent
Heinrich et al.

(10) Patent No.: US 6,812,693 B2
(45) Date of Patent: Nov. 2, 2004

(54) INDUCTIVE DISPLACEMENT SENSOR WITH VOLUME OCCUPYING WINDING

(75) Inventors: Horst Heinrich, Hannover (DE); Jürgen Beimel, Pattensen (DE); Anja Dokter, Lehrte (DE)

(73) Assignee: WABCO GmbH & Co. OHG, Hannover (DE)

(*) Notice: Subject to any disclaimer, the term of this patent is extended or adjusted under 35 U.S.C. 154(b) by 0 days.

(21) Appl. No.: 10/288,962

(22) Filed: Nov. 6, 2002

(65) Prior Publication Data

US 2003/0090263 A1 May 15, 2003

(30) Foreign Application Priority Data

Nov. 9, 2001 (DE) .......................... 101 55 063

(51) Int. Cl.[7] ................................ G01B 7/14
(52) U.S. Cl. .................. 324/207.15; 324/207.16; 324/207.24
(58) Field of Search ............... 324/207.15, 207.16, 324/207.17, 207.24, 207.25, 207.26, 236, 239–243, 258, 260–262; 336/180, 195, 222–224

(56) References Cited

U.S. PATENT DOCUMENTS 6,337,615 B1 * 1/2002 Dittmann et al. .......... 335/299

FOREIGN PATENT DOCUMENTS

| CH | 575115 A | | 4/1976 |
|---|---|---|---|
| DE | 1 958 297 A | | 7/1970 |
| DE | 196 24 801 A1 | | 1/1998 |
| DE | 197 56 604 C2 | | 1/2000 |
| DE | 198 52 628 A1 | | 5/2000 |
| JP | 55120121 A | | 9/1980 |
| JP | 1-199416 | * | 8/1989 |

* cited by examiner

Primary Examiner—Jay Patidar
(74) Attorney, Agent, or Firm—Kramer Levin Naftalis & Frankel LLP

(57) ABSTRACT

An improved inductive displacement sensor for use in a hydraulic accumulator for sampling the degree of filling of the hydraulic accumulator. The displacement sensor is provided with an electrical winding on a coil former. To reduce the gas volume of the hydraulic accumulator, the winding space not occupied by the electrical winding in the coil former is filled with a further winding formed from plastic or other non-magnetic material. The further winding is not electrically connected and is wound about the electrical winding.

6 Claims, 2 Drawing Sheets

INDUCTIVE DISPLACEMENT SENSOR WITH VOLUME OCCUPYING WINDING

BACKGROUND OF THE INVENTION

The present invention is directed generally to an improved inductive displacement sensor for use in a hydraulic accumulator, and more particularly, to an inductive displacement sensor arranged and constructed to reduce the volume of high-pressure gas in the hydraulic accumulator.

DE 198 52 628 A1 discloses a hydraulic accumulator, albeit without a built-in displacement sensor, which can be used for storing and supplying pressurized (hydraulic) fluid in a motor vehicle. The accumulator has a cylindrical housing divided by a bottom plate and a bellows into two separate pressure chambers. The bottom pressure chamber can be connected via a nozzle to the hydraulic system of the vehicle; the upper pressure chamber is filled with a suitable gas, such as nitrogen. When the fluid pressure becomes sufficiently high during filling of the hydraulic accumulator with hydraulic fluid, the bellows together with its charge of high-pressure gas becomes compressed, thus maintaining the desired hydraulic pressure.

Pressure sensors installed at appropriate positions in the hydraulic system monitor the hydraulic pressure. For various reasons, however, it is additionally desirable to monitor the position of the bottom plate of the hydraulic accumulator by displacement measurement. With this type of monitoring, it is possible to detect undesirable gas bubbles in the hydraulic system. The bubbles become compressed when the pressure of the hydraulic fluid is raised and inhibit the initial movement of the bottom plate of the hydraulic accumulator.

In another conventional design, the necessary filling charge of high-pressure gas in a hydraulic accumulator of the type described in DE 198 52 628 A1 can be reduced by using filler elements of incompressible material in the accumulator. This has the advantage that harmful temperature influences on the accumulator pressure are diminished by virtue of the smaller charge of high-pressure gas. Furthermore, the steepness of the pressure displacement characteristic of the hydraulic accumulator can also be increased.

DE 196 24 801 A1, which is incorporated herein by reference, discloses an inductive displacement sensor suitable for measuring the displacement of the bottom plate of a hydraulic accumulator. The displacement sensor has a coil into which an iron core can be inserted to an extent that depends on displacement. The coil is wound on a coil former. The coil former can have a plurality of chambers in which coil windings or winding segments with different numbers of turns or winding heights are disposed to achieve a uniform sensor characteristic. If a winding segment with a small number of turns or low winding height is provided, the annular space between the surface of the coil and the periphery of the coil former remains unoccupied. As a result, the volume filled by the high-pressure gas or the filling charge of the hydraulic accumulator becomes larger, thus diminishing the aforestated advantages of a small filling charge.

It is desired to improve the construction of an inductive displacement sensor for use in a hydraulic accumulator to achieve a desired additional reduction of the gas volume or filling charge of the hydraulic accumulator.

SUMMARY OF THE INVENTION

Generally speaking, in accordance with the present invention, an improved inductive displacement sensor for use in a hydraulic accumulator is provided. The displacement sensor includes a coil former containing windings of electrically conductive wire disposed in at least one chamber of the coil former. In addition to the electrical windings, further windings without electrical connections are wound about (i.e., over and/or under) the electrical windings to fill unoccupied space between the electrical windings and the coil former. Because the additional volume occupied by the further windings is permeable to pressure, the arrangement according to the present invention achieves a desired additional reduction of the volume of high-pressure gas in the hydraulic accumulator.

The further windings can be formed from plastic thread or like material suitable for the high pressures of up to 300 bar that can exist in hydraulic accumulators.

Accordingly, it is an object of the present invention to provide an improved inductive displacement sensor for achieving a desired additional reduction of the gas volume or filling charge in a hydraulic accumulator.

It is another object of the present invention to provide an improved inductive displacement sensor that can be easily and efficiently implemented in a hydraulic accumulator.

It is a further object of the present invention to provide an improved inductive displacement sensor that minimizes instrumental complexity and is cost-effective.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
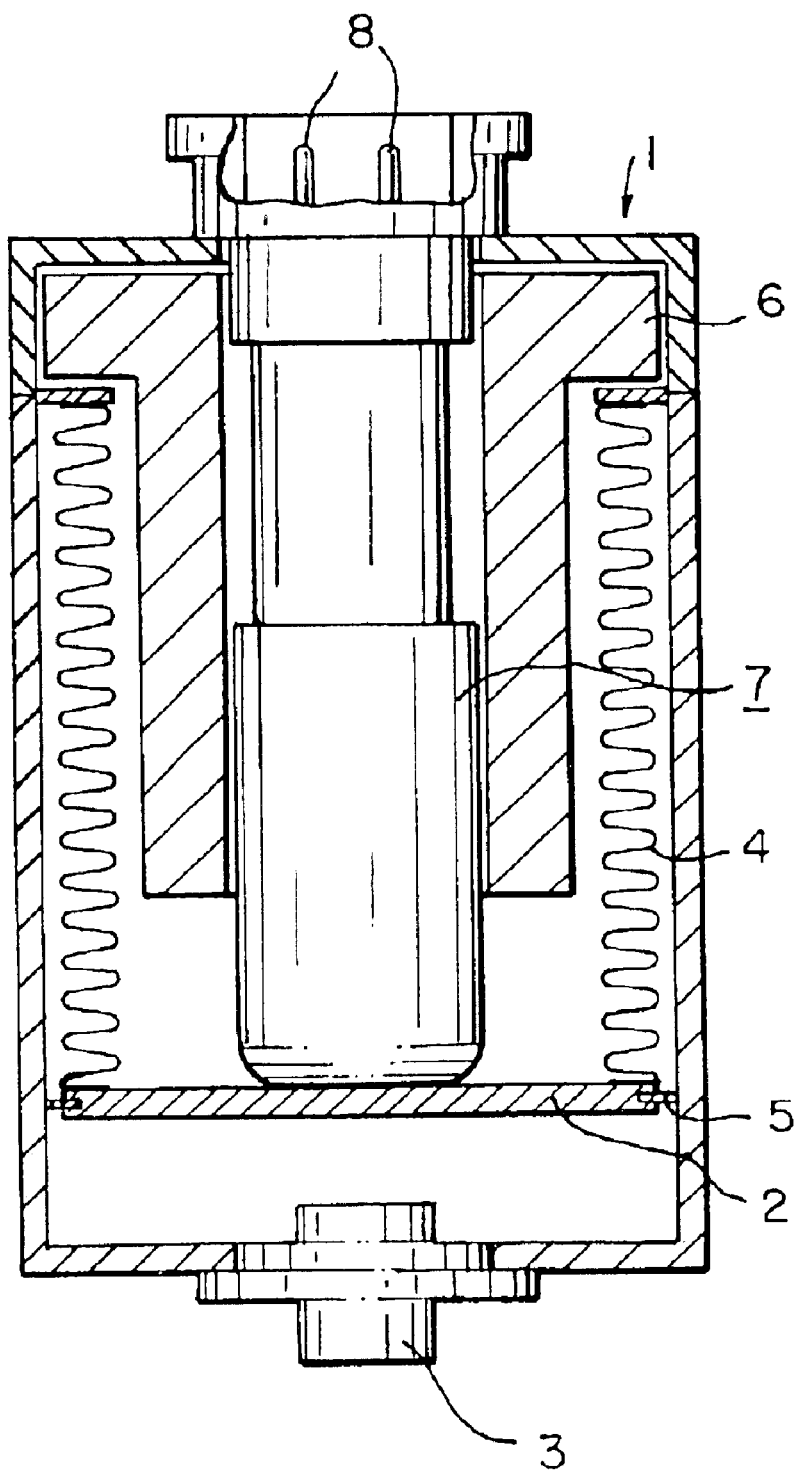
FIG. 1 is a cross-sectional view of a hydraulic accumulator provided with an inductive displacement sensor according to the present invention.

Referring to the drawing figures where like reference numerals are used for corresponding parts, FIG. 1 shows a hydraulic accumulator constructed in accordance with the preferred embodiment of the present invention. The hydraulic accumulator includes a cylindrical outer wall 1, preferably formed from metal. A fluid connection 3 is provided in communication with the hydraulic system of a motor vehicle, such as, for example, a passenger car. A bottom plate 2 movable in vertical direction is braced with a guide 5 against outer wall 1. A bellows 4, preferably formed from metal, is affixed (for example, by welds) to bottom plate 2 at one end and to outer wall 1 at an opposite end to form a gas-tight connection. An incompressible, circularly symmetric filler element 6 is provided for reducing the gas volume present in the hydraulic accumulator.

A centrally installed displacement sensor 7 for measuring the respective position of the bottom plate 2 is also provided. Displacement sensor 7 has a continuously wound coil the ends of which are connected to terminal contacts 8. A preferred construction of displacement sensor 7 is best shown in FIG. 2.

Figure 2:
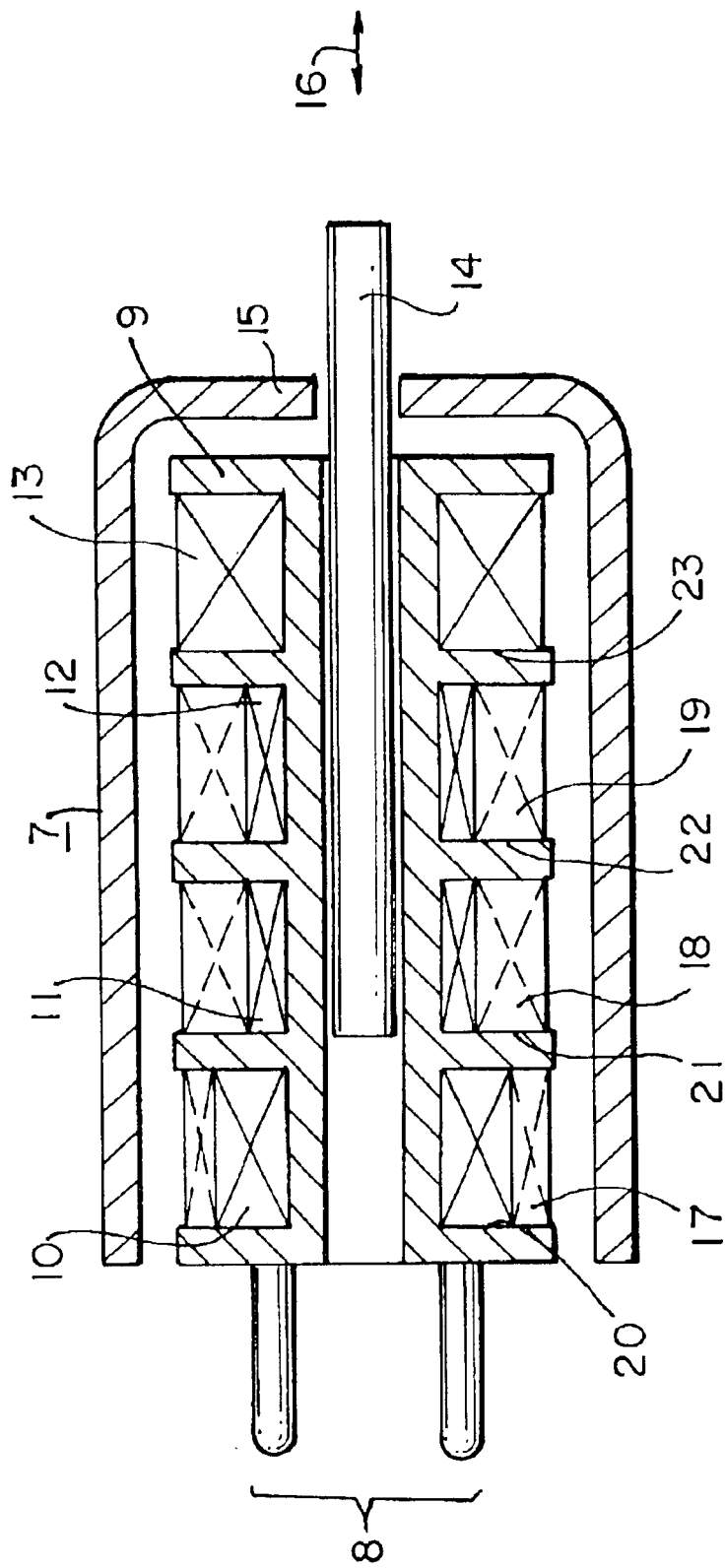
FIG. 2 is a cross-sectional view of the inductive displacement sensor according to the present invention implemented in the hydraulic accumulator as depicted in FIG. 1.

Referring now to FIG. 2, the coil of displacement sensor 7 is disposed in one or more annular chambers of a coil former 9. While FIG. 2 shows coil former 9 as having four chambers 20, 21, 22, 23, it should be understood that the coil former can have a different number of chambers.

The coil can be wound a different numbers of times in one chamber compared to another chamber. Thus, as depicted in FIG. 2, chamber 23 is completely filled with an electrical winding 13. In contrast, the other chambers 20, 21, 22 depicted in FIG. 2 are filled only partly with electrical windings 10, 11, 12. It should be understood to those skilled in the art that this variable distribution of windings ensures that the characteristic of the displacement sensor will be uniform.

The ends of windings 10, 11, 12, 13, which are connected in series, are connected to two terminal contacts 8, for example by soldering or welding.

Displacement sensor 7 also has a core 14 formed from a material that can be magnetized, such as, for example, iron. Core 14, which is movable as a function of displacement, travels in the direction of arrow 16. An end of core 14 is braced against bottom plate 2, whereby the respective position of bottom plate 2 can be measured.

To improve the magnetic characteristics of displacement sensor 7, there is further provided a hood 15 formed from a suitable material that can be magnetized. Hood 15 surrounds coil former 9 and is provided with an aperture for receiving core 14.

It should be understood that the design of inductive displacement sensors, as described to this point, as well as the electronic evaluation thereof, are known to those skilled in the art.

According to the present invention, further windings 17, 18, 19 without electrical connections are wound about electrical windings 10, 11, 12 to fill each of the chambers of coil former 9 that are not completely filled by the electrical windings (i.e., chambers 20, 21, 22). Desirably, all chambers 20, 21, 22, 23 become completely filled. Completely filling the chambers in this way results in a desired additional reduction of volume of the high-pressure gas present in the hydraulic accumulator.

It should be appreciated that the additional volume occupied by the further windings is permeable to pressure. If the unfilled coil chambers were occupied by a material that is impermeable to pressure, such as a potting compound, the potting compound would have to withstand the pressure prevailing in the hydraulic accumulator in order to ensure that the compound does not impact on the electrical winding, which could falsify the sensor signal or destroy the sensor. Thus, such a potting system is subject to disadvantages including difficulties in implementation.

Separate, incompressible elements could be used to fill the partly used winding chambers. However, compared with the inventive arrangement, the sensor would require additional parts and present greater complexity of assembly, resulting in greater cost. Moreover, filler pieces or shaped elements are not capable of displacing the volume to the required extent possible with the arrangement according to the present invention.

Preferably, further windings 17, 18, 19 are formed from plastic thread, the ends of the plastic thread being appropriately secured. It should be appreciated, however, that further windings 17, 18, 19 can also be formed from other non-magnetic wire, as well as wire of the type used for electrical windings 10, 11, 12, 13 but with the ends of the windings disconnected or insulated.

Although the displacement sensor according to the present invention is preferably employed in a hydraulic accumulator, it should be understood that it can be used in other applications where the prevailing gas pressure is high.

Accordingly, the present invention provides an improved inductive displacement sensor arranged and constructed to achieve a desired additional reduction of the volume of high-pressure gas in a hydraulic accumulator, and that avoids undue complexity and cost.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An inductive displacement sensor of an hydraulic accumulator, said displacement sensor comprising a coil former having at least one chamber around a moveable core, at least one winding of electrically conductive wire disposed in said at least one chamber, and at least one further winding about said at least one winding of electrically conductive wire, said at least one further winding not being electrically connected and having a winding height sufficient to fill the space in said at least one chamber of said coil former left unoccupied by said at least one winding of electrically conductive wire to reduce the volume of gas used in said hydraulic accumulator.

2. The inductive displacement sensor according to claim 1, wherein said coil former includes a plurality of chambers, and said at least one further winding has a winding height sufficient to fill at least one of said plurality of chambers of said coil former.

3. The inductive displacement sensor according to claim 1, wherein said at least one further winding is formed from an electrically non-conductive material.

4. The inductive displacement sensor according to claim 1, wherein said at least one further winding is formed from plastic thread.

5. The inductive displacement sensor according to claim 1, wherein said at least one further winding is formed from non-magnetic wire.

6. The inductive displacement sensor according to claim 5, wherein said wire is electrically insulated.

* * * * *